(12) United States Patent
Shen et al.

(10) Patent No.: US 11,938,439 B2
(45) Date of Patent: Mar. 26, 2024

(54) APPARATUS FOR SEPARATING AND REMOVING DUST FROM EXHAUST GAS

(71) Applicant: SUZHOU JINGTIAN AIREN ENVIRONMENTAL TECHNOLOGY CO. LTD., Suzhou (CN)

(72) Inventors: Zhongzeng Shen, Suzhou (CN); Liping Yu, Suzhou (CN); Lingling Li, Suzhou (CN); Feng Wu, Suzhou (CN); Tiantian Tang, Suzhou (CN)

(73) Assignee: SUZHOU JINGTIAN AIREN ENVIRONMENTAL TECHNOLOGY CO. LTD., Jiangsu (CN)

( * ) Notice: Subject to any disclaimer, the term of this patent is extended or adjusted under 35 U.S.C. 154(b) by 498 days.

(21) Appl. No.: 17/210,758

(22) Filed: Mar. 24, 2021

(65) Prior Publication Data
US 2022/0176303 A1 Jun. 9, 2022

Related U.S. Application Data

(63) Continuation of application No. PCT/CN2021/078163, filed on Feb. 26, 2021.

(30) Foreign Application Priority Data

Dec. 9, 2020 (CN) .......................... 202011426456.6

(51) Int. Cl.
*B01D 47/02* (2006.01)
*B01D 29/085* (2006.01)
(Continued)

(52) U.S. Cl.
CPC ......... *B01D 47/021* (2013.01); *B01D 29/085* (2013.01); *B01D 29/11* (2013.01);
(Continued)

(58) Field of Classification Search
None
See application file for complete search history.

(56) References Cited

FOREIGN PATENT DOCUMENTS

| CN | 107308800 A | * 11/2017 | ............. B01D 53/40 |
|---|---|---|---|
| CN | 111225206 A | 6/2020 | |

(Continued)

OTHER PUBLICATIONS

CN111729567A_ENG (Espacenet machine translation of Jiao) (Year: 2020).*

(Continued)

*Primary Examiner* — Gabriel E Gitman
(74) *Attorney, Agent, or Firm* — SZDC Law PC (57) ABSTRACT

The present invention discloses an apparatus for separating and removing dust from exhaust gas, and specifically relates to the field of exhaust gas handling technologies. The apparatus includes a rack, where a dust removal cylinder is disposed on an upper portion of an inner side of the rack, a filter cylinder is detachably connected to a middle portion of a bottom end of the dust removal cylinder, a dust removal mechanism is disposed inside the dust removal cylinder, the dust removal mechanism includes a guide column, an upper end of the guide column is fixedly mounted in a middle portion of an upper end of the rack, several grooves are disposed on an outer side of the guide column, and the groove includes a lower portion.

7 Claims, 8 Drawing Sheets

(51) Int. Cl.
*B01D 29/11* (2006.01)
*B01D 29/64* (2006.01)
*B01D 53/18* (2006.01)

(52) U.S. Cl.
CPC .......... *B01D 29/6476* (2013.01); *B01D 53/18* (2013.01); *B01D 2201/08* (2013.01); *B01D 2201/4092* (2013.01)

(56) References Cited

FOREIGN PATENT DOCUMENTS

| | | | |
|---|---|---|---|
| CN | 111385584 A | | 7/2020 |
| CN | 111729567 A | * 10/2020 | ............ B01F 27/906 |
| CN | 112533000 A | | 3/2021 |
| EP | 3687172 A1 | | 7/2020 |
| WO | 2020050651 A1 | | 3/2020 |

OTHER PUBLICATIONS

CN107308800A_ENG (Espacenet machine translation of Wu) (Year: 2017).*

* cited by examiner

APPARATUS FOR SEPARATING AND REMOVING DUST FROM EXHAUST GAS

This application is a Continuation Application of PCT/CN2021/078163, filed on Feb. 26, 2021, which claims priority to Chinese Patent Application No. 202011426456.6, filed on Dec. 9, 2020, which is incorporated by reference for all purposes as if fully set forth herein.

TECHNICAL FIELD

The present invention relates to the field of exhaust gas handling technologies, and more particularly, to an apparatus for separating and removing dust from exhaust gas.

BACKGROUND

Air pollution refers to the emission of various pollutants into the atmosphere by human production and living activities or the natural world. The amount of the pollutants exceeds the carrying capacity of the environment, which deteriorates the quality of the atmosphere. The continuous deterioration caused by the air pollution leads to problems such as global warming, harm to human health, and impact on the growth of animals and plants. The protection of the atmosphere environment involves environmental planning and management, energy utilization, pollution prevention and control, and other aspects. From the perspective of energy usage, protecting the atmosphere environment can be implemented by developing clean energy, controlling pollution sources and exhaust gas emission, changing conventional energy structures and energy usage manners, and the like. China has a relatively high degree of industrialization, and therefore the handling of industrial exhaust gas is of great significance to environmental protection.

Spraying is usually used in existing methods for handling dust in industrial exhaust gas, and water is used to deposit the dust. However, the exhaust gas is discharged in a large volume and at a fast speed, and therefore cannot reach full contact with the water, causing incomplete handling of the exhaust gas.

The above information disclosed in the background section is intended only to enhance understanding of the background of the present disclosure and may therefore include information that does not constitute the prior art known to a person of ordinary skill in the art.

SUMMARY

To address the foregoing disadvantages in the prior art, an embodiment of the present invention provides an apparatus for separating and removing dust from exhaust gas. The present invention is intended to resolve the following technical problem: When water is used to deposit dust through spraying, exhaust gas is not thoroughly handled because the exhaust gas is discharged in a large volume and at a fast speed and cannot reach full contact with the water.

To achieve the foregoing objective, the present invention provides the following technical solution: An apparatus for separating and removing dust from exhaust gas includes a rack, where a dust removal cylinder is disposed on an upper portion of an inner side of the rack, a filter cylinder is detachably connected to a middle portion of a bottom end of the dust removal cylinder, a dust removal mechanism is disposed inside the dust removal cylinder, the dust removal mechanism includes a guide column, an upper end of the guide column is fixedly mounted in a middle portion of an upper end of the rack, several grooves are disposed on an outer side of the guide column, the groove includes a lower portion, upper portions are disposed on upper parts on both sides of the lower portion, a connecting portion is separately disposed between the two upper portions and the lower portion, one end of each of the two upper portions is communicated with the lower portion through the connecting portion, the other ends of the two upper portions are communicated with each other, a rotating stand is movably sleeved on the outer side of the guide column, the rotating stand includes an upper sleeve member and a lower sleeve member, the upper sleeve member is rotationally connected to an upper end of the dust removal cylinder, several support rods are disposed in the circumferential direction between the upper sleeve member and the lower sleeve member, the upper sleeve member and the lower sleeve member are fixedly connected to each other by using the several support rods, several mounting holes are disposed on each of the several support rods, several gear teeth are disposed in the circumferential direction at an upper end of the upper sleeve member, an inner side of each of the several mounting holes is rotationally connected to a Z-shaped guide shaft, one end of the Z-shaped guide shaft slides on an inner side of the groove, the other end of the Z-shaped guide shaft is fixedly connected to a blade, a connecting rod is disposed on one side of each of the several support rods, and the connecting rod is rotationally connected to one end of each of Z-shaped guide shafts on one support rod;

An inner column is fixedly mounted in an interior on an inner side of the guide column, several long through holes are disposed at an end portion of the inner column, and a bottom end of the inner column extends to below the guide column;

A dust scraping mechanism is disposed directly beneath the inner column, the dust scraping mechanism includes a mounting block, a fixing rod is fixedly connected to one side of an upper end of the mounting block, an upper end of the fixing rod is slidably connected to a bottom end of one connecting rod, several scrapers are fixedly connected in the circumferential direction of a bottom end of the mounting block, and the scrapers are attached to an inner wall of the filter cylinder; and A motor is fixedly mounted on one side of the upper end of the rack, an output shaft of the motor is connected to a spur gear through fitting, the spur gear is meshed with the gear teeth for transmission, an exhaust fan is fixedly mounted on the other side of the upper end of the rack, an intake pipe is fixedly mounted at an air outlet of the exhaust fan, and an air outlet of the intake pipe is communicated with the upper end of the guide column.

In a preferred implementation, a water tank is disposed directly beneath the dust removal cylinder, one side of the water tank is provided with a circulation pump, a water inlet of the circulation pump is communicated with an interior of the water tank, and a water outlet of the circulation pump is communicated with an interior of the dust removal cylinder.

In a preferred implementation, the water inlet of the circulation pump is communicated with the interior of the water tank through a first communication pipe, and the water outlet of the circulation pump is communicated with an upper side of the interior of the dust removal cylinder through a second communication pipe.

In a preferred implementation, a support bracket is fixedly sleeved on a middle portion of the dust removal cylinder, and one end of the support bracket is fixedly connected to a sidewall of the rack.

In a preferred implementation, the filter cylinder is detachably connected to the bottom end of the dust removal cylinder through screw threads.

In a preferred implementation, a bottom end of the filter cylinder is tapered.

In a preferred implementation, an included angle between the scrapers and the horizontal direction is 45 degrees.

The present invention has the following technical effects and advantages:

1. In the present invention, the dust removal cylinder, the filter cylinder, the dust removal mechanism, the inner column, the dust scraping mechanism, the motor, the spur gear, the exhaust fan, the intake pipe, the water tank, and the circulation pump are disposed to introduce industrial exhaust gas into the interior of the dust removal cylinder to form a large quantity of bubbles, and smash and mix the bubbles with water, so that the industrial exhaust gas can be fully mixed with the water to remove dust thoroughly. In addition, the scrapers are used to scrape dust on an inner wall of the filter cylinder, thereby ensuring a filtering speed and a filtering effect.

2. In the present invention, when the apparatus is not in use, the filter cylinder may be detached for cleaning. When the apparatus is in use, the circulation pump may be further started to suck water from the water tank into the dust removal cylinder for reuse.

REFERENCE NUMERALS IN THE DRAWINGS

1: Rack; 2: dust removal cylinder; 21: filter cylinder; 3: dust removal mechanism; 31: guide column; 311: groove; 3111: lower portion; 3112: connecting portion; 3113: upper portion; 32: rotating stand; 321: upper sleeve member; 322: lower sleeve member; 323: support rod; 324: mounting hole; 325: gear tooth; 33: Z-shaped guide shaft; 34: connecting rod; 35: blade; 4: inner column; 41: long through hole; 5: dust scraping mechanism; 51: mounting block; 52: fixing rod; 53: scraper; 6: motor; 61: spur gear; 7: exhaust fan; 71: intake pipe; 8: water tank; 81: circulation pump; 82: first communication pipe; 83: second communication pipe; 9: support bracket.

DESCRIPTION OF EMBODIMENTS

The following describes example implementations more comprehensively with reference to the accompanying drawings. However, the example implementations can be implemented in multiple forms and should not be construed as limitations to the examples set forth herein. Instead, these example implementations are provided to make the description of the present disclosure more comprehensive and complete, and will convey the idea of the example implementations to a person skilled in the art thoroughly. The accompanying drawings are merely schematic diagrams of the present disclosure, and are not necessarily drawn in proportion. The same reference numerals in the drawings represent the same or similar parts, and therefore repeated descriptions thereof will be omitted.

In addition, these described features, structures, or characteristics may be combined in one or more example implementations by using any appropriate manner. In the following description, many details are provided to give a full understanding of the example implementations of the present disclosure. However, a person skilled in the art will realize that one or more of the details may be omitted when the technical solutions of the present disclosure are practiced, or other methods, components, steps, and the like may be used. In other cases, the well-known structures, methods, implementations, or operations are not shown or described in detail in order to avoid obscuring aspects of the present disclosure caused by distractions.

Figure 7:
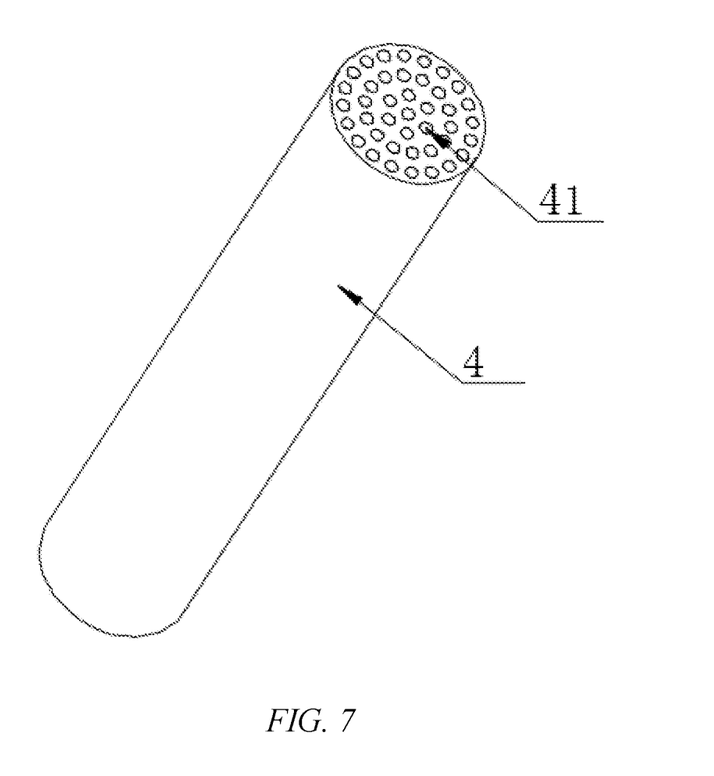
FIG. 7 is a schematic structural diagram of an inner column according to the present invention.
Figure 8:
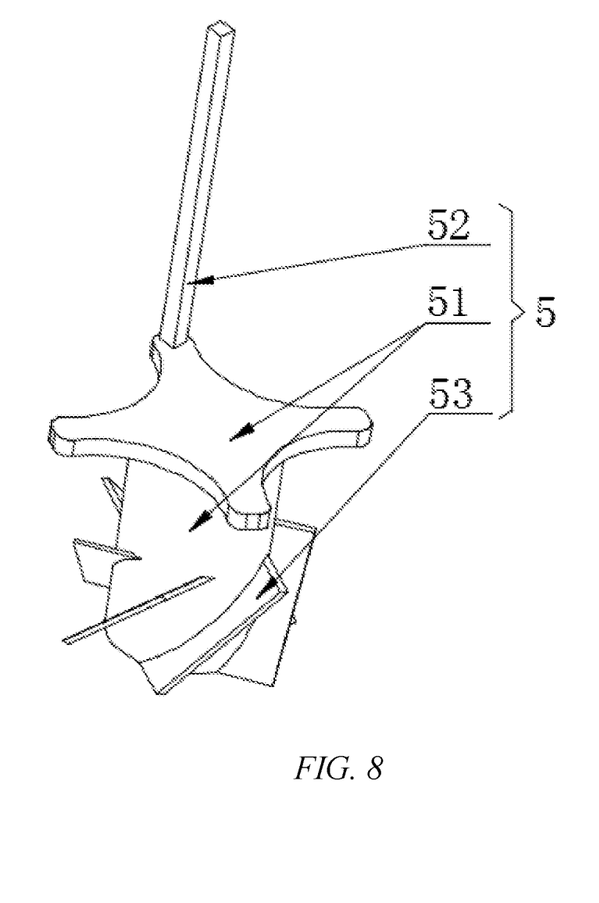
FIG. 8 is a schematic structural diagram of a dust scraping mechanism according to the present invention.

The present invention provides an apparatus for separating and removing dust from exhaust gas, including a rack 1, where a dust removal cylinder 2 is disposed on an upper portion of an inner side of the rack 1, a filter cylinder 21 is detachably connected to a middle portion of a bottom end of the dust removal cylinder 2, a dust removal mechanism 3 is disposed inside the dust removal cylinder 2, the dust removal mechanism 3 includes a guide column 31, an upper end of the guide column 31 is fixedly mounted in a middle portion of an upper end of the rack 1, several grooves 311 are disposed on an outer side of the guide column 31, the groove 311 includes a lower portion 3111, upper portions 3113 are disposed on upper parts on both sides of the lower portion 3111, a connecting portion 3112 is separately disposed between the two upper portions 3113 and the lower portion 3111, one end of each of the two upper portions 3113 is communicated with the lower portion 3111 through the connecting portion 3112, the other ends of the two upper portions 3113 are communicated with each other, a rotating stand 32 is movably sleeved on the outer side of the guide column 31, the rotating stand 32 includes an upper sleeve member 321 and a lower sleeve member 322, the upper sleeve member 321 is rotationally connected to an upper end of the dust removal cylinder 2, several support rods 323 are disposed in the circumferential direction between the upper sleeve member 321 and the lower sleeve member 322, the upper sleeve member 321 and the lower sleeve member 322 are fixedly connected to each other by using the several support rods 323, several mounting holes 324 are disposed on each of the several support rods 323, several gear teeth 325 are disposed in the circumferential direction at an upper end of the upper sleeve member 321, an inner side of each of the several mounting holes 324 is rotationally connected to a Z-shaped guide shaft 33, one end of the Z-shaped guide shaft 33 slides on an inner side of the groove 311, the other end of the Z-shaped guide shaft 33 is fixedly connected to a blade 35, a connecting rod 34 is disposed on one side of each of the several support rods 323, and the connecting rod 34 is rotationally connected to one end of each of Z-shaped guide shafts 33 on one support rod 323;

An inner column 4 is fixedly mounted in an interior on an inner side of the guide column 31, several long through holes 41 are disposed at an end portion of the inner column 4, and a bottom end of the inner column 4 extends to below the guide column 31;

A dust scraping mechanism 5 is disposed directly beneath the inner column 4, the dust scraping mechanism 5 includes a mounting block 51, a fixing rod 52 is fixedly connected to one side of an upper end of the mounting block 51, an upper end of the fixing rod 52 is slidably connected to a bottom end of one connecting rod 34, several scrapers 53 are fixedly connected in the circumferential direction of a bottom end of the mounting block 51, and the scrapers 53 are attached to an inner wall of the filter cylinder 21; and A motor 6 is fixedly mounted on one side of the upper end of the rack 1, an output shaft of the motor 6 is connected to a spur gear 61 through fitting, the spur gear 61 is meshed with the gear teeth 325 for transmission, an exhaust fan 7 is fixedly mounted on the other side of the upper end of the rack 1, an intake pipe 71 is fixedly mounted at an air outlet of the exhaust fan 7, and an air outlet of the intake pipe 71 is communicated with the upper end of the guide column 31.

Figure 1:
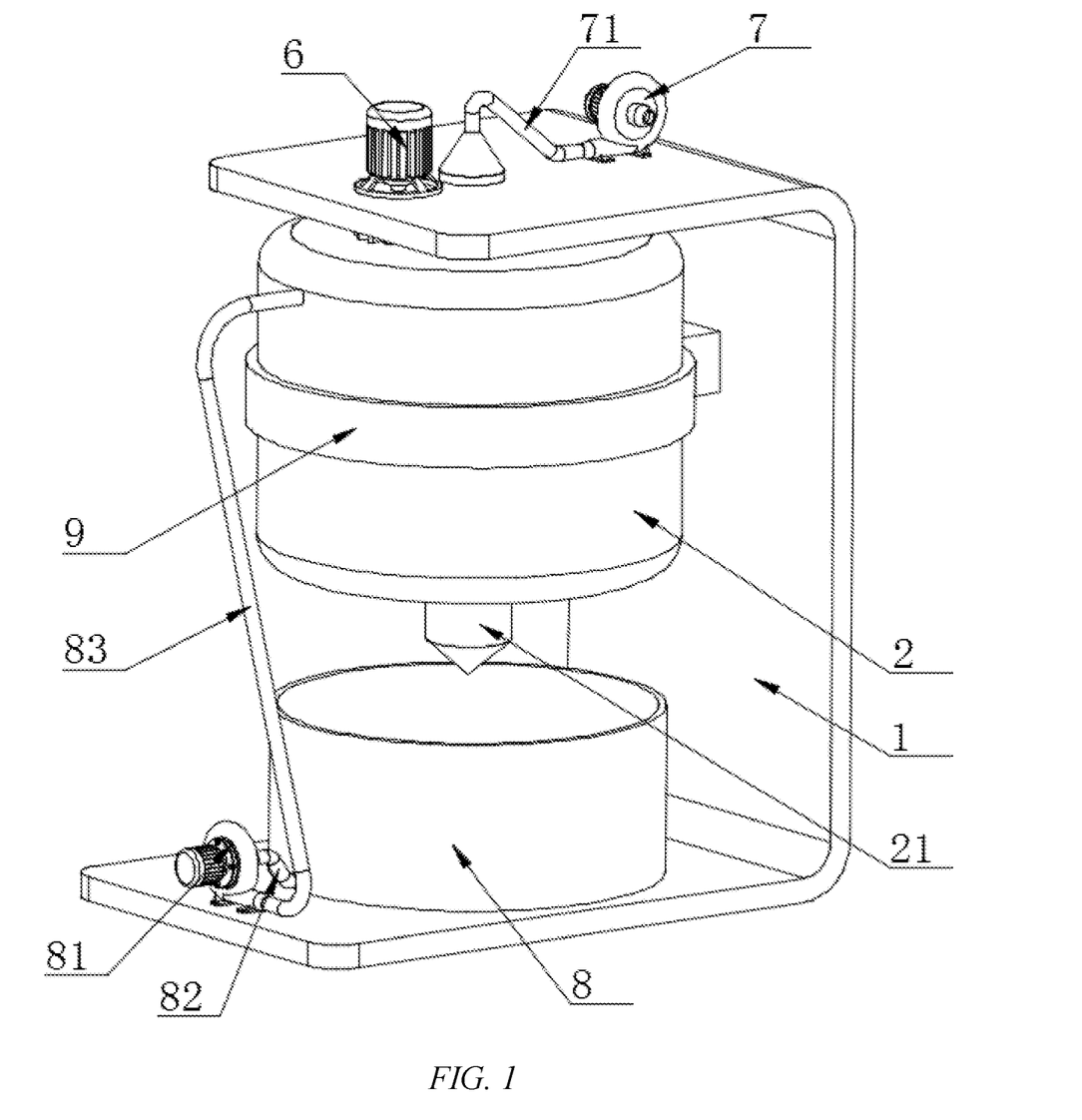
FIG. 1 is a schematic structural diagram of an exterior according to the present invention.
Figure 2:
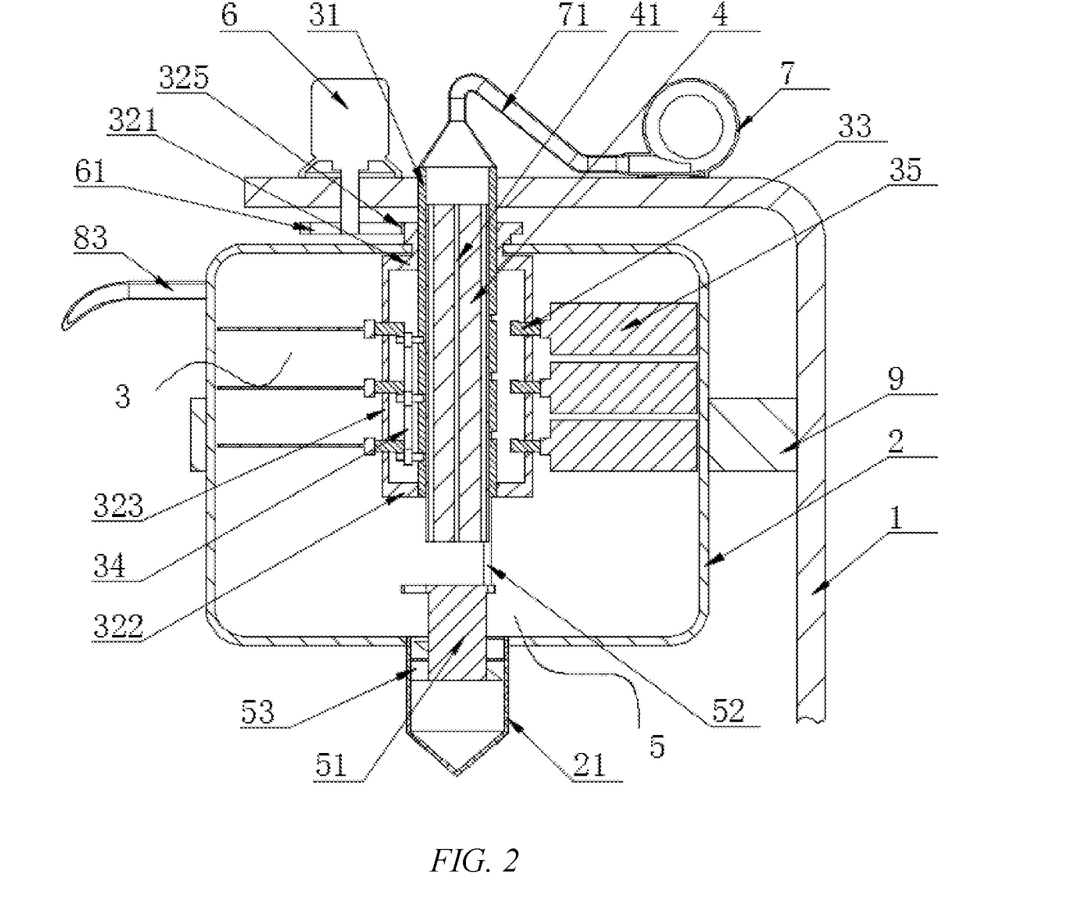
FIG. 2 is a local schematic diagram of a cutaway drawing according to the present invention.
Figure 3:
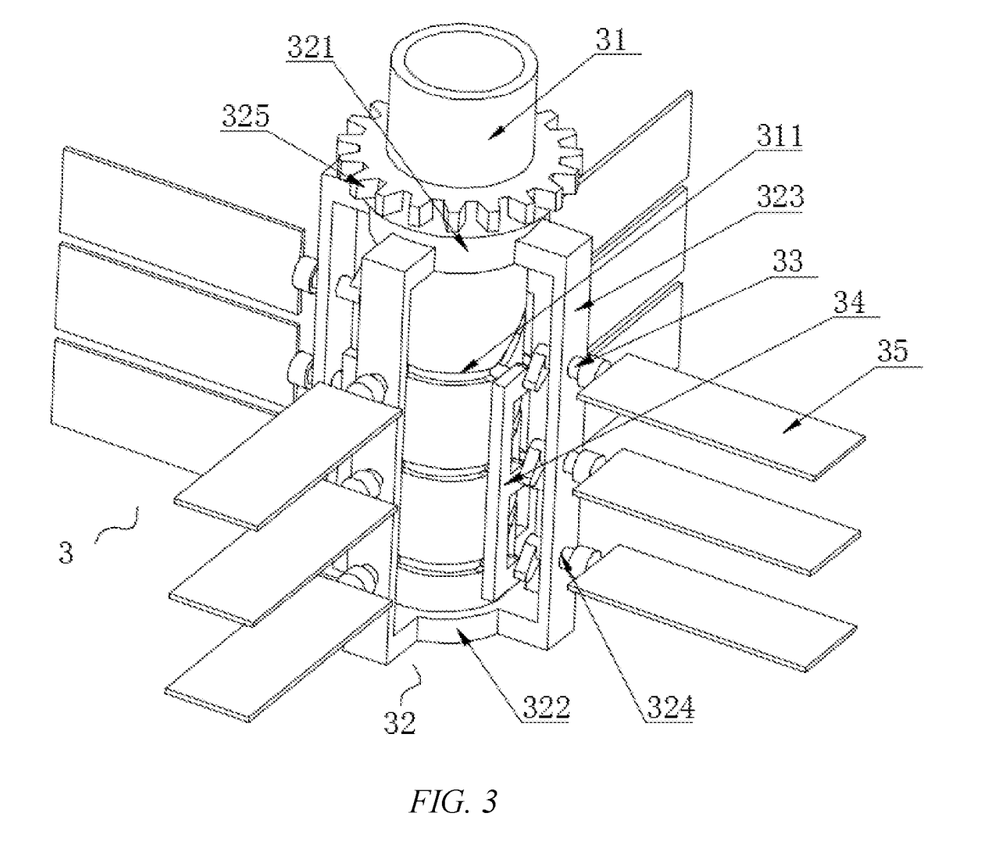
FIG. 3 is a schematic structural diagram of a dust removal mechanism according to the present invention.
Figure 4:
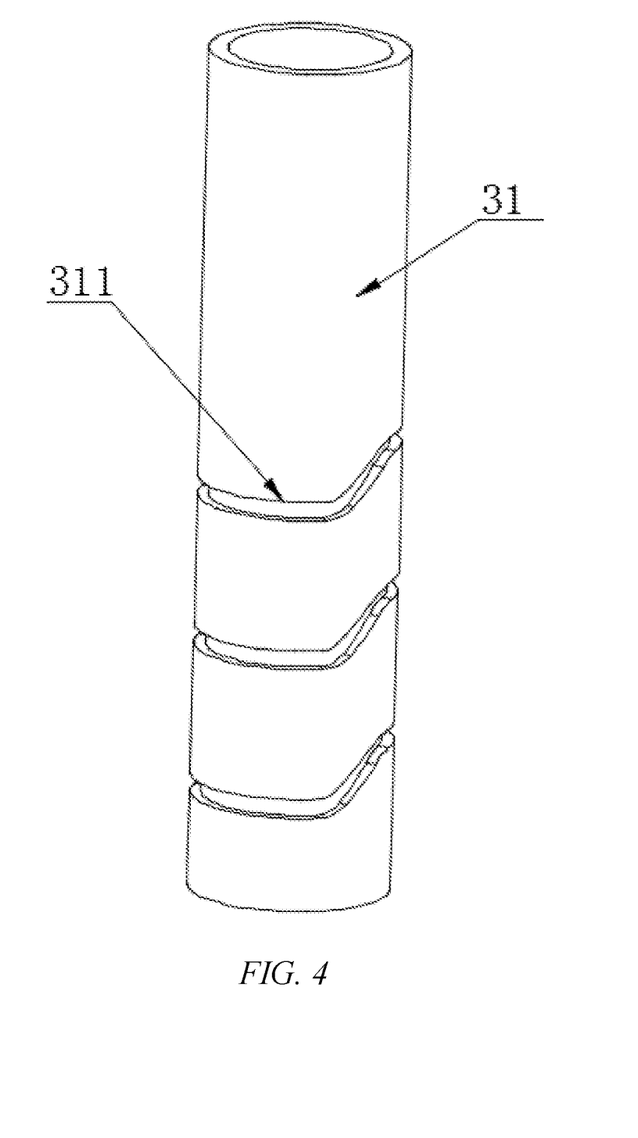
FIG. 4 is a schematic structural diagram of a guide column according to the present invention.
Figure 5:
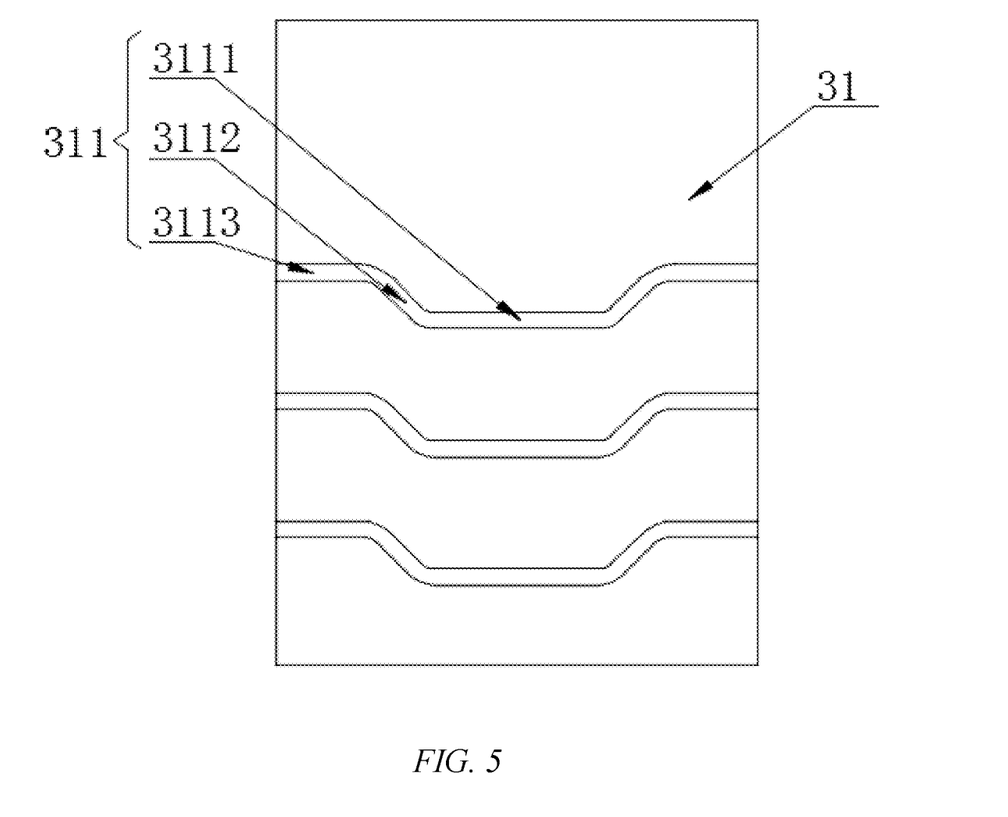
FIG. 5 is an expanded view of a guide column according to the present invention.
Figure 6:
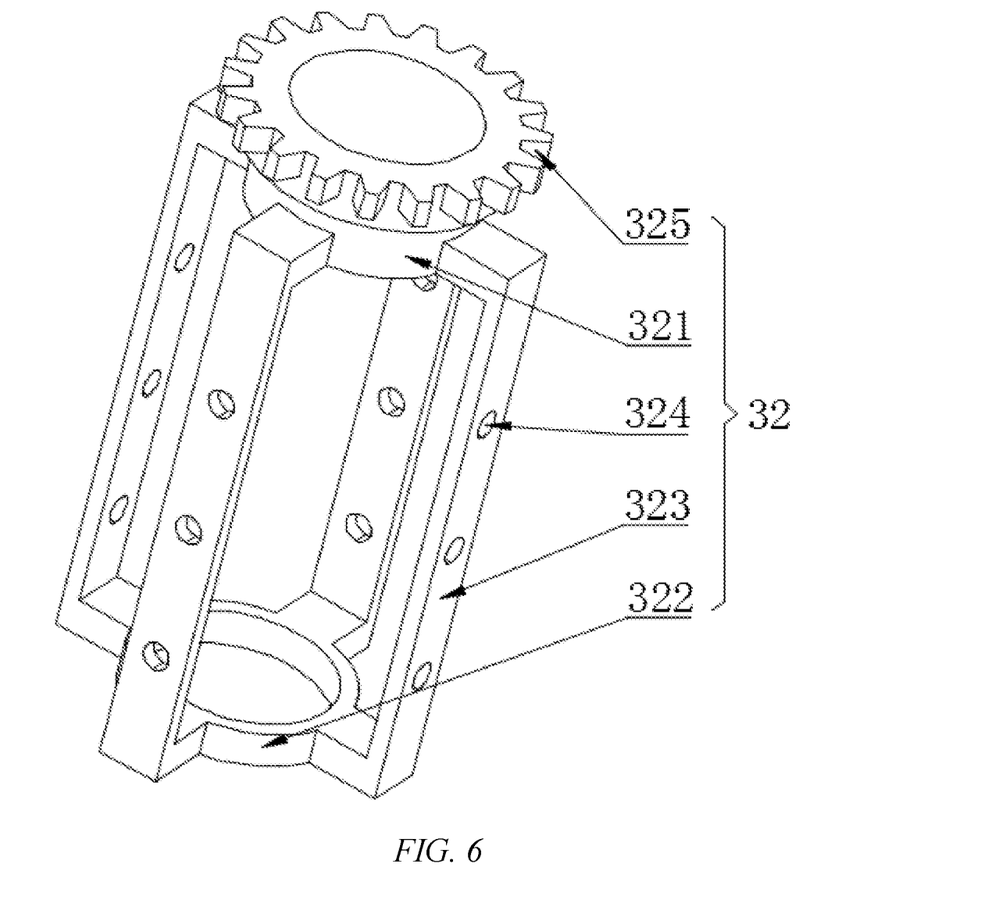
FIG. 6 is a schematic structural diagram of a rotating stand according to the present invention.

A water tank 8 is disposed directly beneath the dust removal cylinder 2, one side of the water tank 8 is provided with a circulation pump 81, a water inlet of the circulation pump 81 is communicated with an interior of the water tank 8, and a water outlet of the circulation pump 81 is communicated with an interior of the dust removal cylinder 2.

The water inlet of the circulation pump 81 is communicated with the interior of the water tank 8 through a first communication pipe 82, and the water outlet of the circulation pump 81 is communicated with an upper side of the interior of the dust removal cylinder 2 through a second communication pipe 83.

A support bracket 9 is fixedly sleeved on a middle portion of the dust removal cylinder 2, and one end of the support bracket 9 is fixedly connected to a sidewall of the rack 1.

The filter cylinder 21 is detachably connected to the bottom end of the dust removal cylinder 2 through screw threads.

A bottom end of the filter cylinder 21 is tapered.

An included angle between the scrapers 53 and the horizontal direction is 45 degrees.

As shown in FIG. 1 to FIG. 8, an implementation is specifically as follows: The motor 6 is started, which utilizes the spur gear 61 and the gear teeth 325 to drive the rotating stand 32 to rotate. As such, the Z-shaped guide shaft 33, the connecting rod 34, and the blade 35 rotate together with the rotating stand 32. In this process, one end of the Z-shaped guide shaft 33 always slides inside in the groove 311. When the Z-shaped guide shaft 33 slides from the lower portion 3111 to the inside of the upper portion 3113, the Z-shaped guide shaft 33 rotates at an angle. When the Z-shaped guide shaft 33 slides from the upper portion 3113 to the inside of the lower portion 3111, the Z-shaped guide shaft 33 rotates reversely at the same angle. The Z-shaped guide shaft 33 further drives the blade 35 to rotate, and further drives the connecting rod 34 to move up and down. That is, when the rotating stand 32 rotates, the blade 35 rotates back and forth, and the connecting rod 34 moves up and down. The connecting rod 34 may drive, by using the fixing rod 52, the mounting block 51 and the scrapers 53 to move up and down and rotate.

When the apparatus is in use, the exhaust fan 7 is started to suck industrial exhaust gas into an upper portion of the guide column 31 through the intake pipe 71, and then introduce the industrial exhaust gas to the bottom of the dust removal cylinder 2 via the long through holes 41. The dust removal cylinder 2 holds water inside. With the long through holes 41 disposed, the industrial exhaust gas introduced to the water forms a large quantity of bubbles. In this process, the blade 35 rotates back and forth continuously, and therefore smashes the bubbles and mixes the industrial exhaust gas with the water at the same time. In this way, dust in the industrial exhaust gas and water-soluble gas are absorbed by the water. The water may be filtered by the filter cylinder 21, and the filtered-out dust accumulates in the filter cylinder 21. As the scrapers 53 rotate, dust on an inner wall of the filter cylinder 21 may be scrapped, thereby ensuring a filtering speed and a filtering effect. When the apparatus is not in use, the filter cylinder 21 may be detached for cleaning. When the apparatus is in use, the circulation pump 81 may be further started to suck water from the water tank 8 into the dust removal cylinder 2 for reuse. Certainly, the water may also be replaced.

The dust removal cylinder 2, the filter cylinder 21, the dust removal mechanism 3, the inner column 4, the dust scraping mechanism 5, the motor 6, the spur gear 61, the exhaust fan 7, the intake pipe 71, the water tank 8, and the circulation pump 81 are disposed to introduce the industrial exhaust gas to the inside of the dust removal cylinder 2 to form a large quantity of bubbles, and smash and mix the bubbles with water, so that the industrial exhaust gas can be fully mixed with the water to remove dust thoroughly. In addition, the scrapers 53 are used to scrape dust on the inner wall of the filter cylinder 21, thereby ensuring the filtering speed and the filtering effect.

Finally, the following should be noted: Firstly, in the description of this application, unless otherwise specified and limited, the terms "mounting," "connected," and "connection" should be understood in a broad sense, which may be a mechanical connection or an electrical connection, or internal communication between two elements, or a direct connection. Terms such as "upper," "lower," "left," and "right" are only used to indicate relative position relationships. When an absolute position of a described object changes, a relative position relationship may change.

Secondly, in the accompanying drawings of the embodiments in the present disclosure, only structures related to the embodiments in the present disclosure are involved. For other structures, reference may be made to a common design. In cases without conflicts, mutual combinations may be implemented for the same embodiment and different embodiments of the present invention.

Finally, the foregoing descriptions are merely example embodiments of the present invention, but are not intended to limit the present invention. Any modification, equivalent replacement, and improvement made without departing from the spirit and principle of the present invention shall fall within the protection scope of the present invention.

What is claimed is:

1. An apparatus for separating and removing dust from exhaust gas, comprising
   a rack (1),
   wherein a dust removal cylinder (2) is disposed on an upper portion of an inner side of the rack (1),
   a filter cylinder (21) is detachably connected to a middle portion of a bottom end of the dust removal cylinder (2),
   a dust removal mechanism (3) is disposed inside the dust removal cylinder (2),
   the dust removal mechanism (3) comprises a guide column (31),
   an upper end of the guide column (31) is fixedly mounted in a middle portion of an upper end of the rack (1), several grooves (311) are disposed on an outer side of the guide column (31), wherein each groove (311) comprises a lower portion (3111), upper portions (3113) of each groove are respectively disposed on both sides of and above the lower portion (3111), a respective connecting portion (3112) is disposed between each of the two upper portions (3113) and the lower portion (3111), a first end of each of the two upper portions (3113) communicates with the lower portion (3111) through its respective connecting portion (3112), second ends of the two upper portions (3113) communicates with each other, a rotating stand (32) is movably sleeved on the outer side of the guide column (31), the rotating stand (32) comprises an upper sleeve member (321) and a lower sleeve member (322), the upper sleeve member (321) is rotationally connected to an upper end of the dust removal cylinder (2), several support rods (323) are spaced apart in the circumferential direction between the upper sleeve member (321) and the lower sleeve member (322), the upper sleeve member (321) and the lower sleeve member (322) are fixedly connected to each other by using the several support rods (323), several mounting holes (324) are disposed on each of the several support rods (323), several gear teeth (325) are disposed in a circumferential direction at an upper end of the upper sleeve member (321), an inner side of each of the several mounting holes (324) provides a connection between one of the support rods to a respective Z-shaped guide shaft (33) to allow rotation of the Z-shaped guide shaft, one end of each Z-shaped guide shaft (33) slides on an inner side of a respective groove (311), another end of the respective Z-shaped guide shaft (33) is fixedly connected to a blade (35), a connecting rod (34) is disposed on one side of each of the several support rods (323), and each connecting rod (34) is rotationally connected to ends of the Z-shaped guide shafts (33) on a respective support rod (323);

an inner column (4) is fixedly mounted in an interior on an inner side of the guide column (31), several 1-eng longitudinal through holes (41) are disposed through the inner column (4), and a bottom end of the inner column (4) extends to below the guide column (31);

a dust scraping mechanism (5) is disposed directly beneath the inner column (4), the dust scraping mechanism (5) comprises a mounting block (51), a fixing rod (52) is fixedly connected to one side of an upper end of the mounting block (51), an upper end of the fixing rod (52) is slidably connected to a bottom end of one connecting rod (34), several scrapers (53) are fixedly connected in the circumferential direction of a bottom end of the mounting block (51), and the scrapers (53) are attached to an inner wall of the filter cylinder (21); and a motor (6) is fixedly mounted on one side of the upper end of the rack (1), an output shaft of the motor (6) is connected to a spur gear (61) through a fitting, the spur gear (61) is meshed with the gear teeth (325) for transmission, an exhaust fan (7) is fixedly mounted on the other side of the upper end of the rack (1), an intake pipe (71) is fixedly mounted at an air outlet of the exhaust fan (7), and an air outlet of the intake pipe (71) is communicated with the upper end of the guide column (31).

2. The apparatus for separating and removing dust from exhaust gas according to claim 1, wherein a water tank (8) is disposed directly beneath the dust removal cylinder (2), one side of the water tank (8) is provided with a circulation pump (81), a water inlet of the circulation pump (81) is communicated with an interior of the water tank (8), and a water outlet of the circulation pump (81) is communicated with an interior of the dust removal cylinder (2).

3. The apparatus for separating and removing dust from exhaust gas according to claim 2, wherein the water inlet of the circulation pump (81) is communicated with the interior of the water tank (8) through a first communication pipe (82), and the water outlet of the circulation pump (81) is communicated with an upper side of the interior of the dust removal cylinder (2) through a second communication pipe (83).

4. The apparatus for separating and removing dust from exhaust gas according to claim 1, wherein a support bracket (9) is fixedly sleeved on a middle portion of the dust removal cylinder (2), and one end of the support bracket (9) is fixedly connected to a sidewall of the rack (1).

5. The apparatus for separating and removing dust from exhaust gas according to claim 1, wherein the filter cylinder (21) is detachably connected to the bottom end of the dust removal cylinder (2) through screw threads.

6. The apparatus for separating and removing dust from exhaust gas according to claim 1, wherein a bottom end of the filter cylinder (21) is tapered.

7. The apparatus for separating and removing dust from exhaust gas according to claim 1, wherein an included angle between the scrapers (53) and the horizontal direction is 45 degrees.

* * * * *